(12) United States Patent
Hyde et al.

(10) Patent No.: US 9,188,995 B2
(45) Date of Patent: Nov. 17, 2015

(54) MANAGED TRANSMISSION LINE COUPLED COOLING SYSTEM

(75) Inventors: Roderick A. Hyde, Redmond, WA (US); Jordin T. Kare, Seattle, WA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 673 days.

(21) Appl. No.: 13/454,409

(22) Filed: Apr. 24, 2012

(65) Prior Publication Data

US 2013/0277038 A1  Oct. 24, 2013

Related U.S. Application Data

(63) Continuation-in-part of application No. 13/454,507, filed on Apr. 24, 2012, which is a continuation-in-part of application No. 13/454,544, filed on Apr. 24, 2012.

(51) Int. Cl.
| | | |
|---|---|---|
| F28F 7/00 | (2006.01) |
| H01B 9/00 | (2006.01) |
| G05D 23/19 | (2006.01) |
| F28F 27/00 | (2006.01) |
| F28D 15/02 | (2006.01) |
| F28F 1/12 | (2006.01) |
| H02G 7/00 | (2006.01) |
| F28D 21/00 | (2006.01) |
| H02G 3/03 | (2006.01) |

(52) U.S. Cl.
CPC ........ *G05D 23/1919* (2013.01); *F28D 15/0266* (2013.01); *F28D 15/0275* (2013.01); *F28F 1/12* (2013.01); *F28F 27/00* (2013.01); *H02G 7/00* (2013.01); *F28D 2021/0028* (2013.01); *F28F 2200/00* (2013.01); *H02G 3/03* (2013.01)

(58) Field of Classification Search
CPC combination set(s) only.
See application file for complete search history.

(56) References Cited

U.S. PATENT DOCUMENTS

| | | | |
|---|---|---|---|
| 3,541,487 A | 11/1970 | Leonard | |
| 4,009,417 A | 2/1977 | Waldon et al. | |
| 4,093,968 A | 6/1978 | Shirey | |
| 4,626,387 A | 12/1986 | Dodds | |
| 6,261,481 B1 | 7/2001 | Akatsuka et al. | |
| 2006/0201468 A1* | 9/2006 | Lancaster et al. | 123/179.5 |
| 2008/0245520 A1 | 10/2008 | Hyde et al. | |

(Continued)

FOREIGN PATENT DOCUMENTS

DE  197 29 554 A1  1/1999

OTHER PUBLICATIONS

PCT International Search Report; International App. No. PCT/US2013/037536; Aug. 2, 2013; pp. 1-2.

(Continued)

*Primary Examiner* — Jared Fureman
*Assistant Examiner* — Aqeel Bukhari

(57) ABSTRACT

Described embodiments include a system, a method, and a computer program product. A described system includes an air-pump-based cooling apparatus configured to mount on and cool a portion of a live transmission line of a power transmission system, wherein the power transmission system is configured to transport electric power from one place to another. The described system includes a temperature management device configured to assess a temperature condition of the transmission line and actuate the air-pump-based cooling apparatus in response to the assessment.

45 Claims, 15 Drawing Sheets

(56) References Cited

U.S. PATENT DOCUMENTS

| | | |
|---|---|---|
| 2009/0019689 A1 | 1/2009 | Zobel et al. |
| 2009/0250449 A1 | 10/2009 | Petrenko et al. |
| 2009/0322205 A1 | 12/2009 | Lowery |
| 2010/0018672 A1 | 1/2010 | Yang |
| 2010/0087322 A1* | 4/2010 | Yuan et al. ............ 505/163 |
| 2010/0193175 A1 | 8/2010 | Gilliland et al. |
| 2010/0230087 A1 | 9/2010 | Ouyang |
| 2011/0011621 A1 | 1/2011 | Hyde et al. |
| 2011/0110108 A1 | 5/2011 | Calon et al. |
| 2011/0110396 A1 | 5/2011 | Grayson et al. |

OTHER PUBLICATIONS

PCT International Search Report; International App. No. PCT/US2013/037538; Aug. 1, 2013; pp. 1-2.

Zensuke Iwata et al., "Heat Pipe Local Cooling System Applied for 145 KV Transmission Lines in Copenhagen", IEEE, 1991, printed on Mar. 12, 2012, pp. 52-60, IEEE.

N.E. Jewell-Larsen et al., "Numerical simulation and optimization of electrostatic air pumps", printed on Mar. 28, 2012.

* cited by examiner

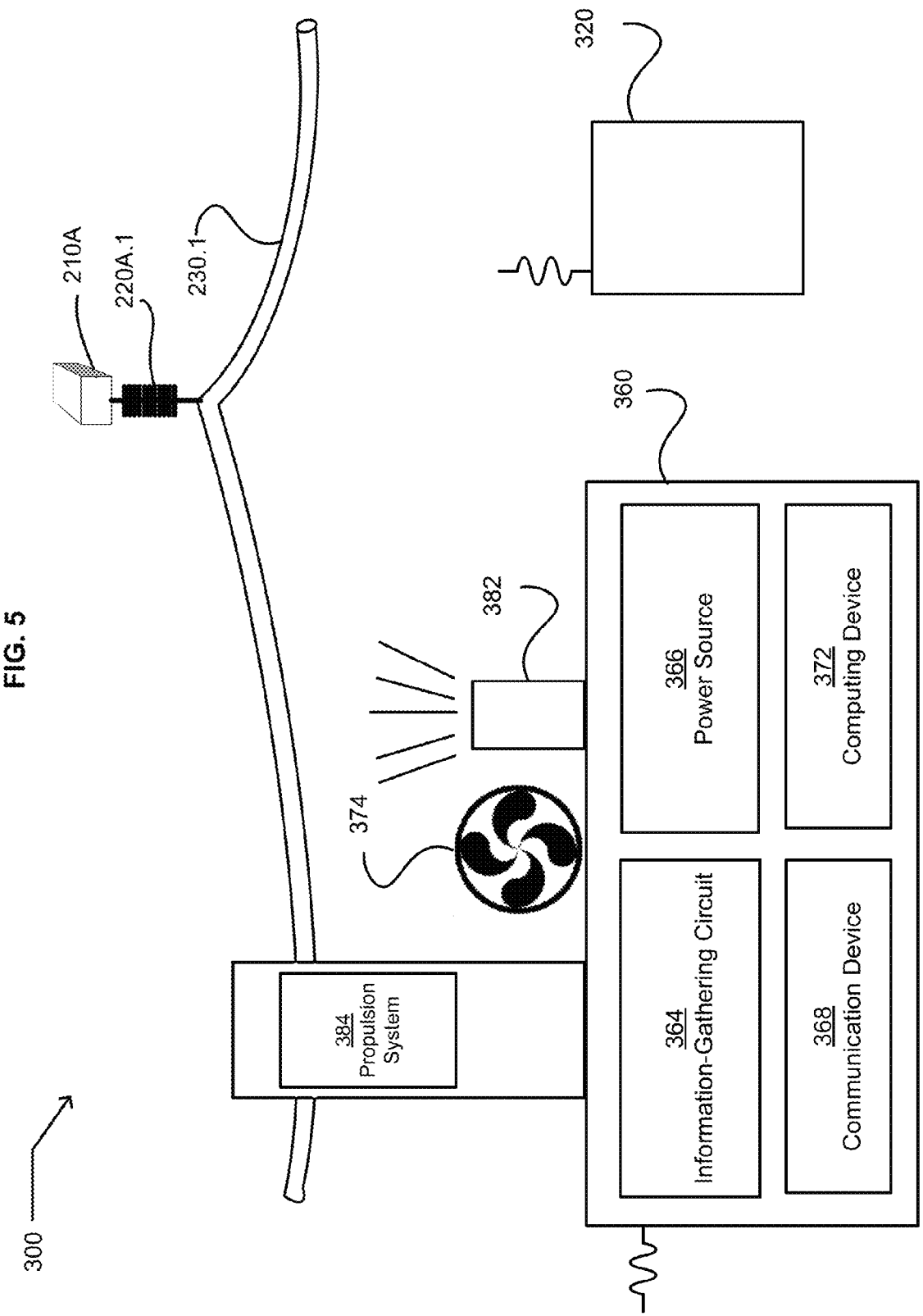

Start

↓

410
Receiving data indicative of a parameter evidencing or influencing a temperature condition of a transmission line of a power transmission system, the power transmission system in use configured to transport electric power from one place to another.

↓

420
Assessing a temperature condition of the transmission line in response to the data.

↓

430
Actuating an air-pump-based cooling apparatus in response to the assessment of the temperature condition, the air-pump-based cooling apparatus mounted on the transmission line and configured to cool a portion of the transmission line.

↓

End

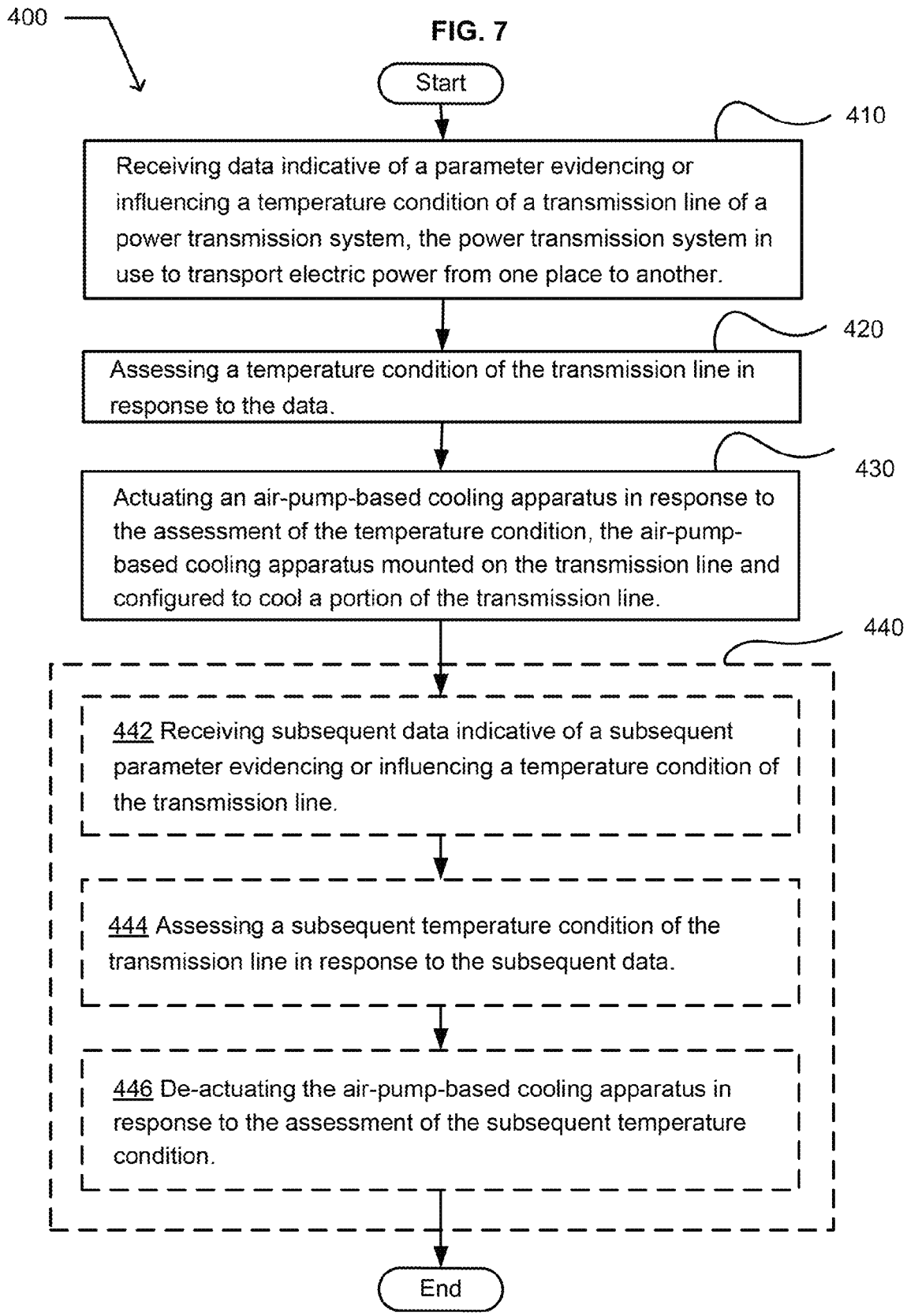

510 Computer-readable media.

520 program instructions which, when executed by a processor of a computing device, cause the computing device to perform a process including:

(a) receiving data indicative of a parameter evidencing or influencing a temperature condition of a transmission line of a power transmission system in use to transport electric power from one place to another;

(b) assessing a temperature condition of the transmission line in response to the data; and (c) actuating an air-pump-based cooling apparatus in response to the assessment of the temperature condition, the air-pump-based cooling apparatus mounted on the transmission line and configured to cool a portion of the transmission line; and 524 Outputting a signal providing a particular visual depiction indicative of the actuating of the air-pump-based cooling apparatus.

514 The computer-readable media includes a communications media.

522 Providing a notification of the actuating of the air-pump-based cooling apparatus to at least one of a human, computer, or a system.

512 The computer-readable media includes a tangible computer-readable media.

FIG. 9

520 program instructions which, when executed by a processor of a computing device, cause the computing device to perform a process including:

(a) receiving data indicative of a parameter evidencing or influencing a temperature condition of a transmission line of a power transmission system in use to transport electric power from one place to another;

(b) assessing a temperature condition of the transmission line in response to the data; and (c) actuating an air-pump-based cooling apparatus in response to the assessment of the temperature condition, the air-pump-based cooling apparatus mounted on the transmission line and configured to cool a portion of the transmission line; and (d) receiving subsequent data indicative of a subsequent parameter evidencing or influencing a temperature condition of the transmission line;

(e) assessing a subsequent temperature condition of the transmission line in response to the subsequent data; and (f) de-actuating the air-pump-based cooling apparatus in response to the assessment of the subsequent temperature condition.

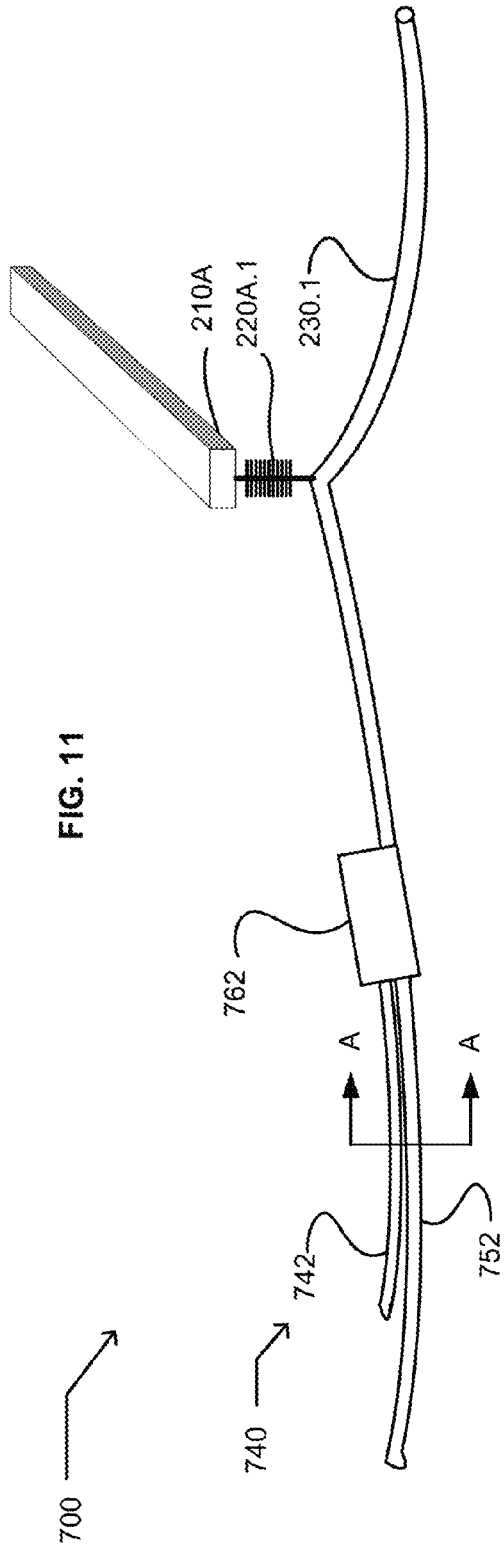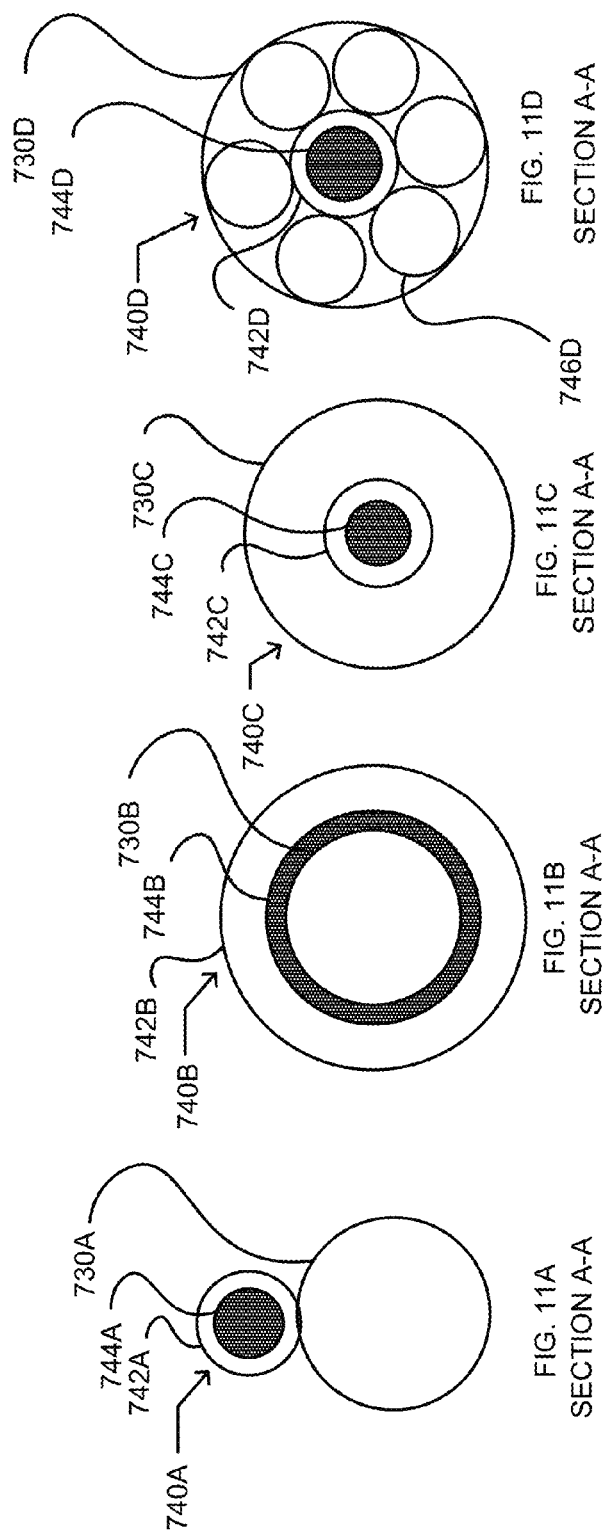

Start

↓

810 — Transmitting electric power over a transmission line of a power transmission system configured to transmit electrical power from one place to another.

↓

820 — Maintaining a closed-cycle heat transfer device in a thermal coupling with and disposed substantially along a portion of the transmission line, the closed-cycle heat transfer device having a hollow member containing a working fluid tuned to transport heat received from the transmission line to a heat removal structure.

↓

830 — Removing heat from the portion of the transmission line using the closed-cycle heat transfer device.

↓

End

FIG. 13

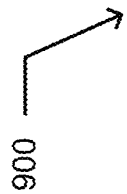

910 Means for applying electrical power to a transmission line of a power transmission system configured to transport electric power from one place to another.

920 Means for maintaining a closed-cycle heat transfer device in a thermal coupling with and disposed substantially along a portion of the transmission line, the closed-cycle heat transfer device having a hollow member containing a working fluid tuned to transport heat received from the transmission line to a means for dissipating heat.

930 The means for dissipating heat configured to be mounted on the transmission line or on a structure associated with the power transmission system.

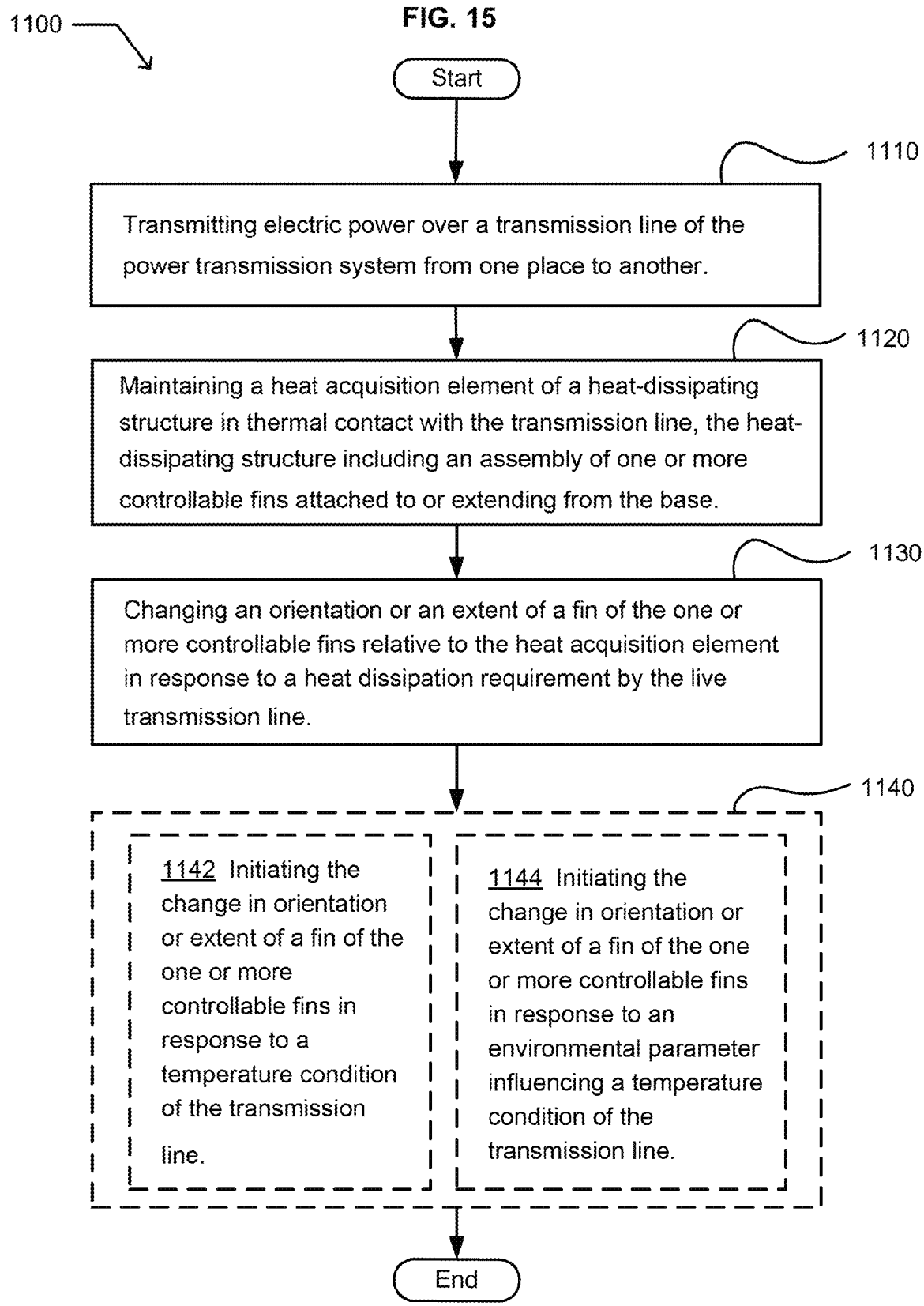

MANAGED TRANSMISSION LINE COUPLED COOLING SYSTEM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For the purposes of the USPTO extra-statutory requirement, the present application constitutes a continuation in part of U.S. patent application Ser. No. 13/454,507, entitled TRANSMISSION-LINE COUPLED CLOSED-CYCLE HEAT TRANSFER DEVICE, naming Roderick A. Hyde, Jordin T. Kare, Thomas A. Weaver, and Lowell L. Wood, Jr., as inventors, filed Apr. 24, 2012, which is currently co-pending, or is an application of which a currently co-pending application is entitled to the benefit of the filing date.

For the purposes of the USPTO extra-statutory requirement, the present application constitutes a continuation in part of U.S. patent application Ser. No. 13/454,544, entitled TRANSMISSION-LINE COUPLED HEAT-DISSIPATION DEVICE WITH AN ASSEMBLY OF ONE OR MORE CONTROLLABLE FINS, naming Roderick A. Hyde, Jordin T. Kare, Thomas A. Weaver, and Lowell L. Wood, Jr., as inventors, filed Apr. 24, 2012, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent that such subject matter is not inconsistent herewith.

APPLICATIONS INCORPORATED BY REFERENCE

U.S. patent application Ser. No. 13/436,299, entitled APPARATUS AND SYSTEM FOR SCHEDULING MOBILE DEVICE OPERATIONS ON A POWER TRANSMISSION SYSTEM, naming Roderick A. Hyde, and Lowell L. Wood, Jr., as inventors, filed Mar. 30, 2012.

U.S. patent application Ser. No. 13/436,404, entitled MOBILE DEVICE CONFIGURED TO PERFORM TASKS RELATED TO A POWER TRANSMISSION SYSTEM, naming Roderick A. Hyde, and Lowell L. Wood, Jr., as inventors, filed Mar. 30, 2012.

U.S. patent application Ser. No. 13/436,462, entitled DEVICES CONFIGURED TO COOPERATIVELY MEASURE PROPERTIES OF A POWER TRANSMISSION SYSTEM, naming Roderick A. Hyde, and Lowell L. Wood, Jr., as inventors, filed Mar. 30, 2012.

U.S. patent application Ser. No. 13/436,520, entitled MOBILE DEVICE CONFIGURED TO TRAVEL ON A TRANSMISSION LINE AND PROVIDE ASSISTANCE, naming Roderick A. Hyde, and Lowell L. Wood, Jr., as inventors, filed Mar. 30, 2012, which is currently co-pending, or is an application of which a currently co-pending application is entitled to the benefit of the filing date.

All subject matter of these Applications Incorporated by Reference is incorporated herein by reference to the extent that such subject matter is not inconsistent herewith.

SUMMARY

For example, and without limitation, an embodiment of the subject matter described herein includes a system. In this embodiment, the system includes an air-pump-based cooling apparatus configured to mount on and cool a portion of a live transmission line of a power transmission system. The power transmission system configured to transport electric power from one place to another. The system includes a temperature management device configured to assess a temperature condition of the transmission line and actuate the air-pump-based cooling apparatus in response to the assessment. In an embodiment, the air-pump-based cooling apparatus includes one or more line-mounted fans. In an embodiment, the temperature management device further includes an information-gathering circuit configured to acquire data indicative of a parameter influencing the temperature condition of the transmission line.

For example, and without limitation, an embodiment of the subject matter described herein includes a method. In this embodiment, the method includes receiving data indicative of a parameter evidencing or influencing a temperature condition of a transmission line of a power transmission system. The power transmission system in use transports electric power from one place to another. The method includes assessing a temperature condition of the transmission line in response to the data. The method includes actuating an air-pump-based cooling apparatus in response to the assessment of the temperature condition. The air-pump-based cooling apparatus is mounted on the transmission line and configured to cool a portion of the transmission line. In a further embodiment, the method includes receiving subsequent data indicative of a subsequent parameter evidencing or influencing a temperature condition of the transmission line. The further embodiment includes assessing a subsequent temperature condition of the transmission line in response to the subsequent data. The further embodiment includes de-actuating the air-pump-based cooling apparatus in response to the assessment of the subsequent temperature condition.

For example, and without limitation, an embodiment of the subject matter described herein includes a computer program product. In this embodiment, the computer program product includes a computer-readable media bearing program instructions. The program instructions which, when executed by a processor of a computing device, cause the computing device to perform a process. The process includes receiving data indicative of a parameter evidencing or influencing a temperature condition of a transmission line of a power transmission system in use to transport electric power from one place to another. The process includes assessing a temperature condition of the transmission line in response to the data. The process includes actuating an air-pump-based cooling apparatus in response to the assessment of the temperature condition, the air-pump-based cooling apparatus mounted on the transmission line and configured to cool a portion of the transmission line. In another embodiment, the process includes receiving subsequent data indicative of a subsequent parameter evidencing or influencing a temperature condition of the transmission line. The another embodiment includes assessing a subsequent temperature condition of the transmission line in response to the subsequent data. The another embodiment includes de-actuating the air-pump-based cooling apparatus in response to the assessment of the subsequent temperature condition. In a further embodiment, the process includes providing a notification of the actuating of the air-pump-based cooling apparatus to at least one of a human, computer, or a system. In a further embodiment, the process includes outputting a signal providing a particular visual depiction indicative of the actuating of the air-pump-based cooling apparatus.

For example, and without limitation, an embodiment of the subject matter described herein includes a system. In this embodiment, the system includes means for receiving data indicative of a parameter evidencing or influencing a temperature condition of a transmission line of a power transmission system. The power transmission system configured to transport electric power from one place to another. The system includes means for assessing a temperature condition of the transmission line in response to the data. The system includes means for actuating an air-pump-based cooling apparatus in response to the assessment of the temperature condition. The air-pump-based cooling apparatus configured to be mounted on the transmission line and configured to cool a portion of the transmission line. In an alternative embodiment, the system includes means for receiving subsequent data indicative of a subsequent parameter evidencing or influencing a temperature condition of the transmission line. In the alternative embodiment, the system includes means for assessing a subsequent temperature condition of the transmission line in response to the subsequent data. In the alternative embodiment, the system includes means for de-actuating the air-pump-based cooling apparatus in response to the assessment of the subsequent temperature condition.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 illustrates an embodiment of the air-pump-based cooling apparatus 360 of FIG. 4;

FIG. 6 illustrates an example operational flow 400 in which embodiments may be implemented;

FIG. 7 illustrates an alternative embodiment of the operational flow 400 of FIG. 6;

FIG. 8 illustrates an example computer program product 500 in which embodiments may be implemented;

FIG. 9 illustrates an alternative embodiment of the process of the computer program instructions 520 of FIG. 8;

FIG. 11 illustrates an example environment 700 in which embodiments may be implemented;

FIG. 12 illustrates an example operational flow 800 reducing a temperature of a transmission line of a power transmission system;

FIG. 13 illustrates an example system 900 in which embodiments may be implemented;

FIG. 15 illustrates an example operational flow 1100 dissipating heat generated by transmission lines of a power transmission system configured to transmit electrical power from one place to another.

DETAILED DESCRIPTION

Figure 1:
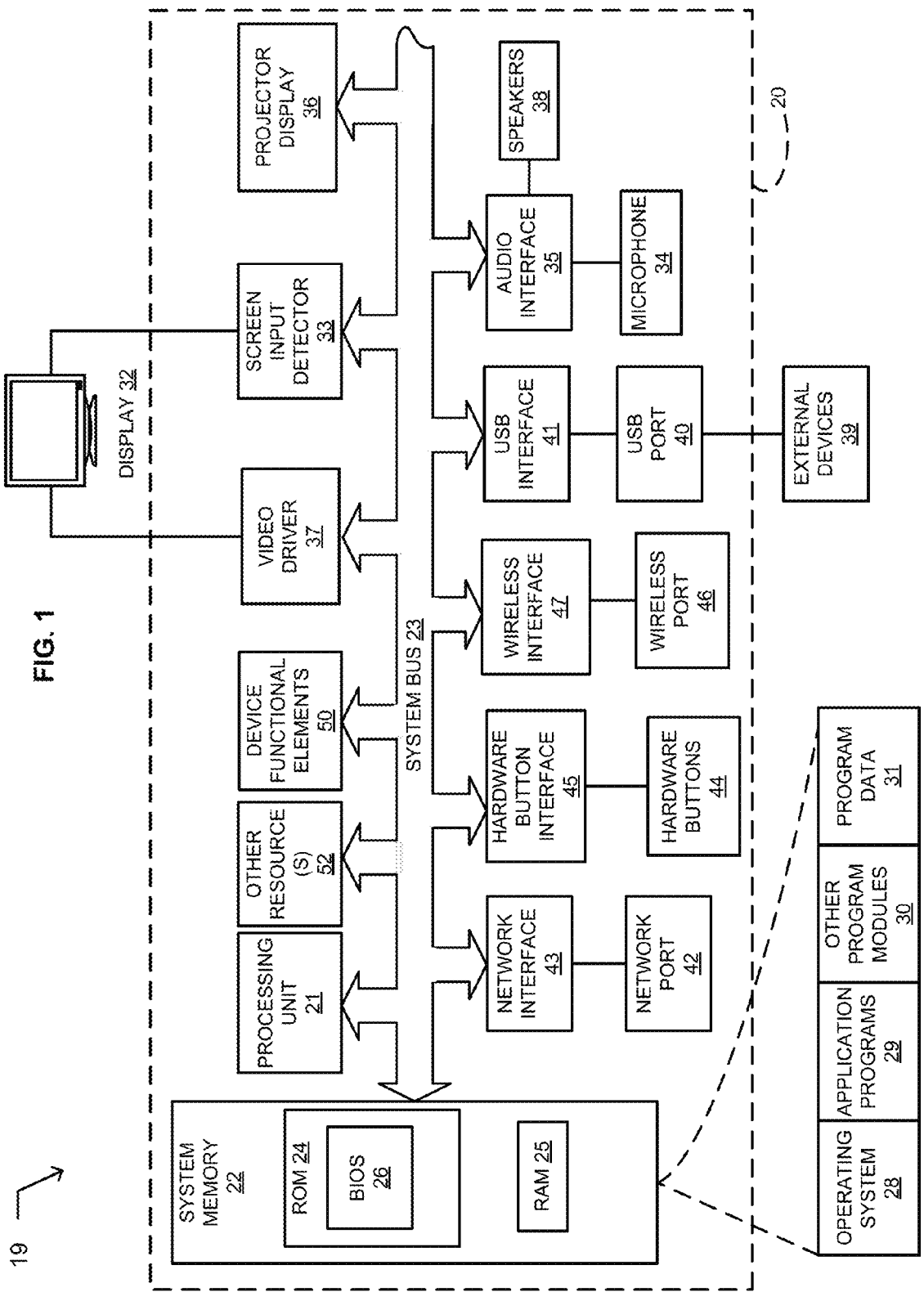
FIG. 1 illustrates an example embodiment of a thin computing device 19 in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical, as used herein, is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
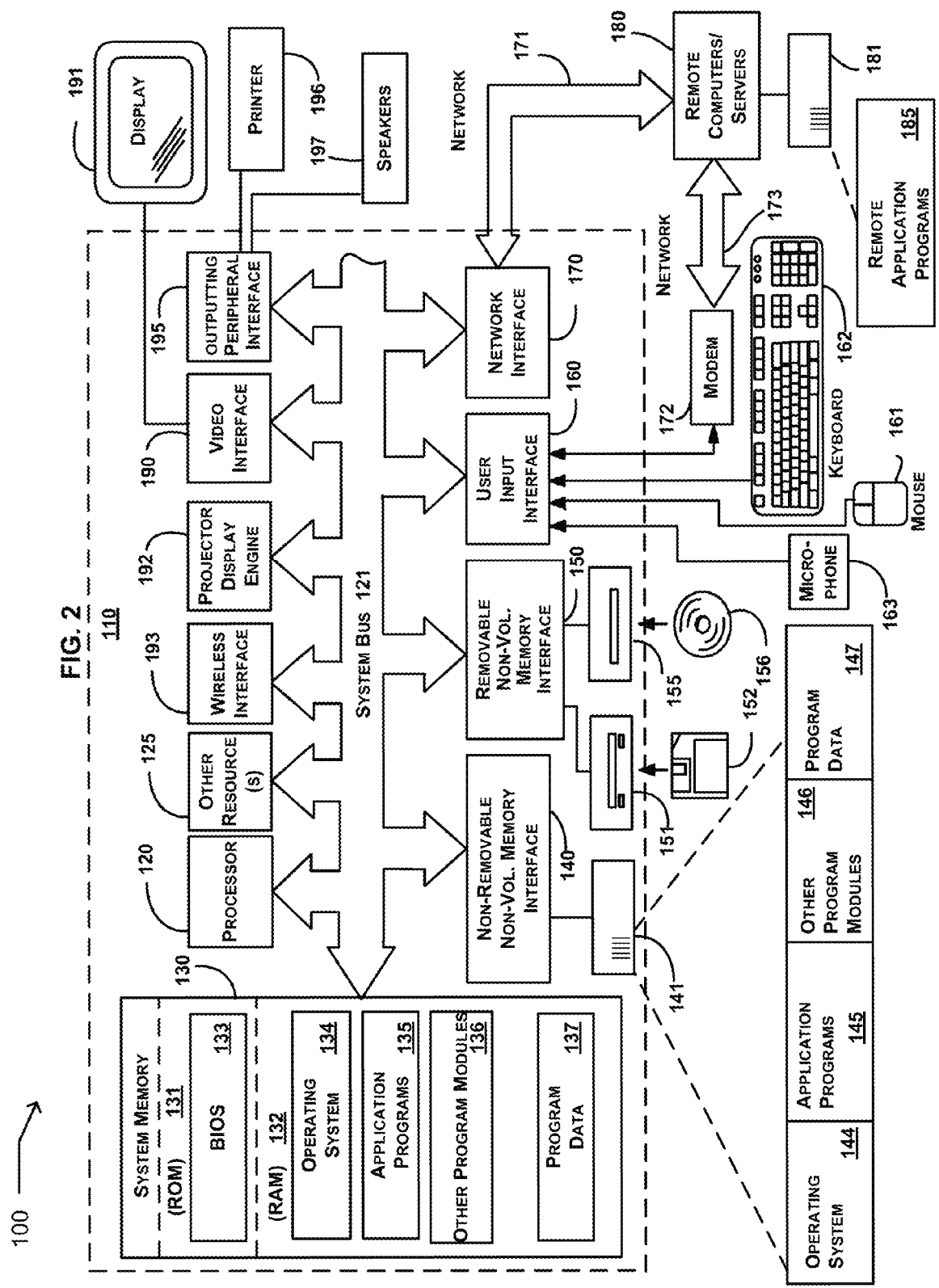
FIG. 2 illustrates an example embodiment of a general-purpose computing system 100 in which embodiments may be implemented.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented. FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer, an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®), or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive display, or one or more switches or buttons with suitable input detection circuitry. A touch-sensitive display is illustrated as a display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137.

Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch sensitive display, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, or to the network 173 through the modem 172, or through the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing communication link between the computers may be used.

In certain instances, one or more elements of the computing device 110 may be deemed not necessary and omitted. In other instances, one or more other elements may be deemed necessary and added to the computing device.

Figure 3:
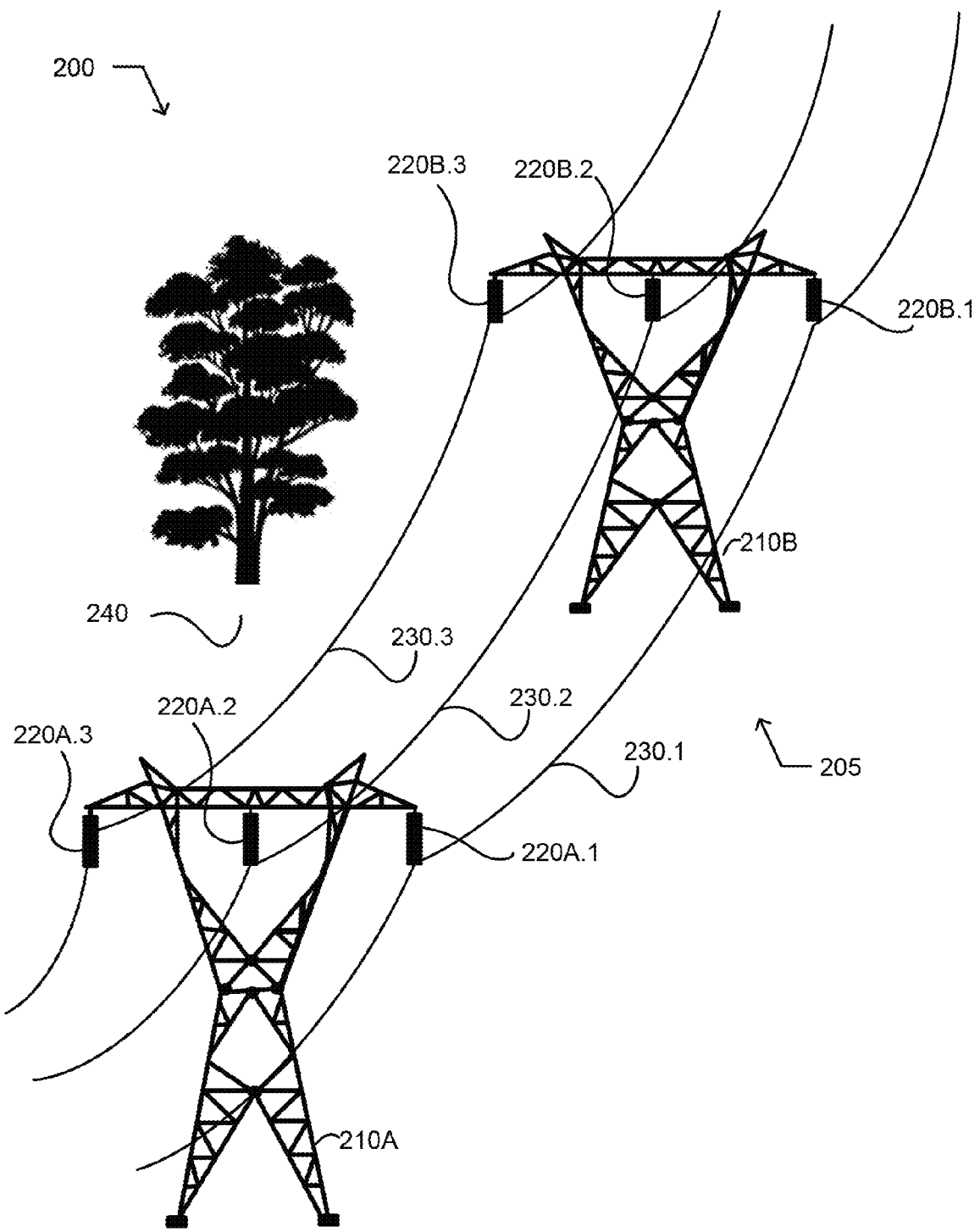
FIG. 3 illustrates an example environment 200 in which embodiments may be implemented.

FIG. 3 illustrates an example environment 200 in which embodiments may be implemented. The illustrated environment includes high-voltage power transmission system configured to transport electric power from one place to another. For example, the system may be configured to transport electric power from Bonneville Dam on the Columbia River to Portland, Oreg. FIG. 3 illustrates an example of the high-voltage power transmission system as an overhead high-voltage power transmission system 205. In another example, the high-voltage power transmission system may be an underground high-voltage power transmission system.

In an embodiment, a high-voltage power transmission system may include a power transmission system designed and insulated to transport electric power from one place to another at voltage over approximately 35,000 volts. For example, voltages of high-voltage power transmission may include 138 kV, 230 kV, 345 kV, 500 kV, or 765 kV. In an embodiment, a power distribution system may include a system designed and insulated to transport and distribute electrical power from a high-voltage power transmission system to a subtransmission customer. For example, voltages of a power distribution system may include 26 kV or 69 kV, to a primary customer at 13 kV or 4 kV, or to a secondary customer at 120V or 240V.

Structures associated with the example system 205 include transmission towers 210 supporting transmission lines 230 suspended from insulators 220. FIG. 3 illustrates example transmission towers as towers 210A and 210B. Example insulators 220 are illustrated as insulators 220A.1, 220A.2, and 220A.3 mounted on the tower 210A and insulators 220B.1, 220B.2, and 220B.3 mounted on the tower 210B. The insulators may be made, for example, from wet-process porcelain, toughened glass, glass-reinforced polymer composites or other non-ceramic materials. Example transmission lines 230 are illustrated as transmission lines 230.1, 230.2, and 230.3. High-voltage power transmission systems are subject to operational risks, such as for example, weather conditions, ambient temperatures, lightning, or precipitation affect on overhead high-voltage power transmission system. The environment 200 includes vegetation growing proximate to one or more transmission lines, illustrated as a tree 240.

Figure 4:
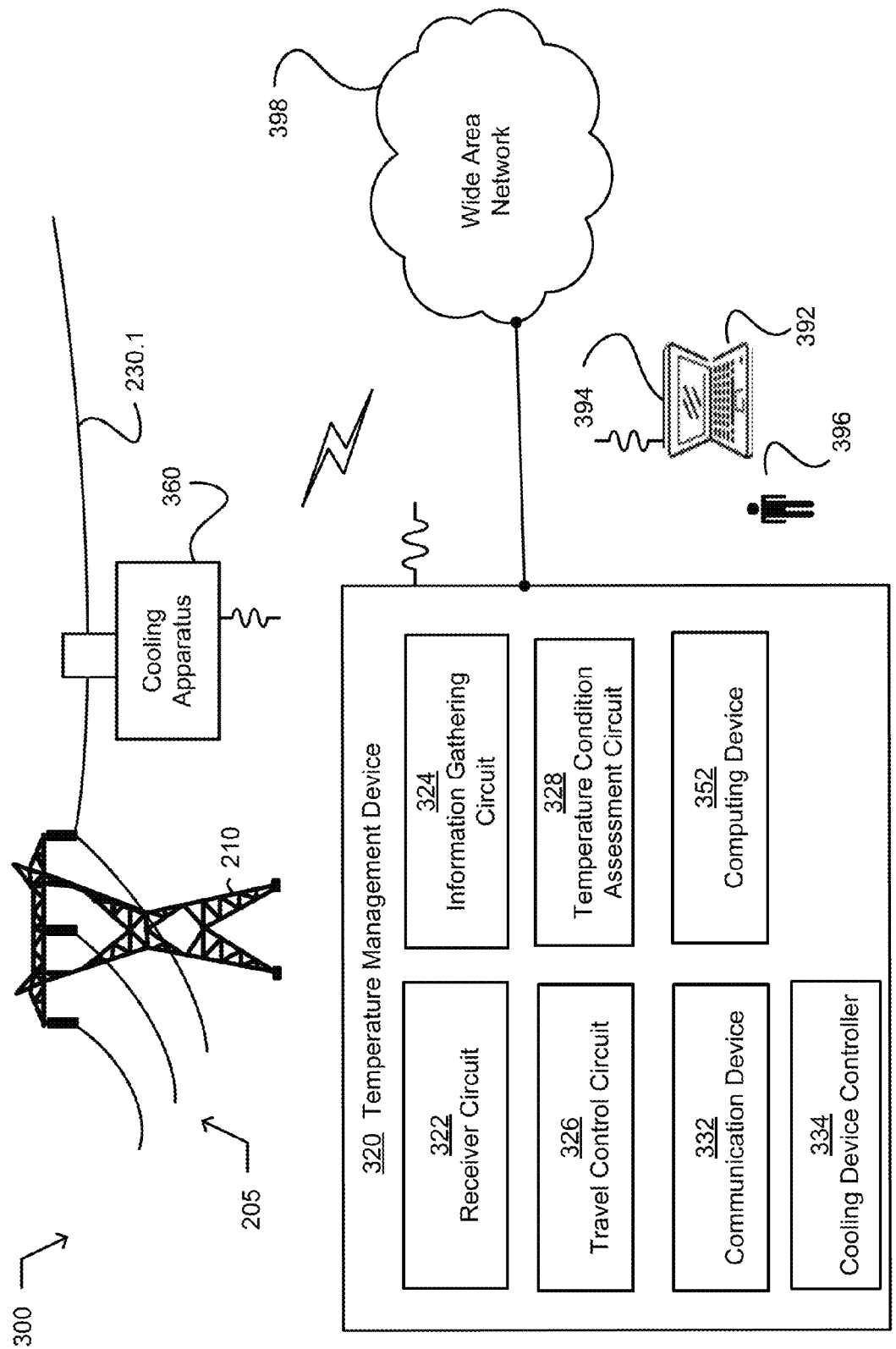
FIG. 4 illustrates an example environment 300 in which embodiments may be implemented.

FIG. 4 illustrates an example environment 300 in which embodiments may be implemented. The environment includes the high-voltage power transmission system 205 described in conjunction with FIG. 3, and is illustrated by the tower 210 and the transmission line 230.1. The environment 300 includes an air-pump-based cooling apparatus 360 configured to mount on and cool a portion of a live transmission line of a power transmission system, illustrated by the transmission line 230.1. The power transmission system is configured to transport electric power from one place to another. The environment includes a temperature management device 320 configured to assess a temperature condition of the transmission line. The temperature management device is also configured to actuate the air-pump-based cooling apparatus. In an embodiment, a cooling device controller 334 of the temperature management device is configured to actuate the air-pump-based cooling apparatus. In an embodiment, the actuate air-pump-based cooling apparatus may include actuating the air-pump-based cooling apparatus to cool the portion of the transmission line. In an embodiment, the actuate air-pump-based cooling apparatus may include activate the air-pump-based cooling apparatus. In an embodiment, the actuate air-pump-based cooling apparatus may include switching on the air-pump-based cooling apparatus. In an embodiment, the actuate air-pump-based cooling apparatus may include causing another device to activate the air-pump-based cooling apparatus. In an embodiment, the actuate the air-pump-based cooling apparatus may include put into motion, move to action, triggering an action, prompting, or urging the air-pump-based cooling apparatus to operate.

The example environment 300 includes a remote computing environment, illustrated as a computing environment 392 that includes a display 394. In an embodiment, the computing environment may include one or more elements of the computing environment 19 described in conjunction with FIG. 1, or the computing environment 100 described in conjunction with FIG. 2. The example environment 300 includes a person 396. In an environment, the computing environment 392 may interact with the person, such as receiving input from the person, or providing output to the person, including via the display 394.

In an embodiment, the power transmission system 205 includes a high-voltage power transmission system. In an embodiment, the power transmission system includes a power distribution system. In an embodiment, the transmission line 230.1 includes a live overhead transmission line.

FIG. 5 illustrates an embodiment of the air-pump-based cooling apparatus 360 of FIG. 4. In an embodiment, the air-pump-based cooling apparatus 360 is configured to actively cool a portion of the transmission line 230.1. In an embodiment, the air-pump-based cooling apparatus is configured to statically mount on a transmission line. In an embodiment, the air-pump-based cooling apparatus is configured to mount on and travel over a transmission line. In an embodiment, the air-pump-based cooling apparatus includes a power source 366 configured to operate on power drawn from the power transmission system 205. In an embodiment, the air-pump-based cooling apparatus is inductively or quasi-DC power coupled to one or more power transmission lines of the power transmission system.

In an embodiment, the air-pump-based cooling apparatus 360 includes one or more line-mounted fans. For example, the line-mounted fan may include a rotary line-mounted fan 374. In an embodiment, the one or more line-mounted fans are configured to force airflow along the transmission line 230.1.

In an embodiment, the one or more line-mounted fans are configured to be positioned substantially evenly along a length of the transmission line. In an embodiment, the one or more line-mounted fans are configured to be positioned at specific locations along the overhead transmission line, including one or more of a mid-span location, a lowest line-ground clearance location, and/or a location on a lowest conductor of multi-conductor line. In an embodiment, the one or more line-mounted fans are configured to operate at fixed speeds or at variable speeds. In an embodiment, the one or more line-mounted fans include independently movable sets of blades with different sets having different blade radii and/or blade pitch. In an embodiment, the one or more line-mounted fans include one or more fan blades that can be recessed or refracted when not in use. In an embodiment, the one or more line-mounted fans are configured to operate at fixed sites along the line. In an embodiment, longitudinal propulsion of the mobile fan along the transmission line is powered by line current and/or aerodynamic fan forces. In an embodiment, the air-pump-based cooling apparatus includes a propulsion system 384 configured to move or travel the cooling apparatus along the transmission line. In an embodiment, the propulsion system is configured to move or travel the rotary line-mounted fan along the transmission line.

In an embodiment, the air-pump-based cooling apparatus 360 is further configured to force airflow through a heat exchanger device of the cooling apparatus, illustrated as the heat exchanger 382. In an embodiment, the air-pump-based cooling apparatus includes one or more line-mounted fans configured to force airflow through a heat exchanger, illustrated as the rotary line-mounted fan 374 forcing airflow through the heat exchanger. In an embodiment, the air-pump-based cooling apparatus is further configured to move a heat exchanger device of the cooling apparatus through ambient air. For example, blades of a rotary line-mounted fan may include a radiator or finned structure configured to be moved through ambient air. In an embodiment, the air-pump-based cooling apparatus 360 includes an electrostatic air pump (not illustrated). In an embodiment, the electrostatic air pump is configured to force airflow through the heat exchanger device of the cooling apparatus. For example, an electrostatic air pump may include an ionic air mover or an ionic wind pump.

In an embodiment, the temperature management device 320 illustrated in more detail by FIG. 4 is configured to assess a temperature of the transmission line 230.1 and actuate the air-pump-based cooling apparatus 360 in response to the assessment. In an embodiment, the temperature management device is configured to assess an ambient wind velocity proximate to the transmission line and actuate the air-pump-based cooling apparatus in response to the assessment. In an embodiment, the temperature management device is configured to assess a line sag of the transmission line and actuate the air-pump-based cooling apparatus in response to the assessment. In an embodiment, the temperature management device is configured to assess a power, current, or voltage level of the transmission line and actuate the air-pump-based cooling apparatus in response to the assessment. In an embodiment, the temperature management device is configured to actuate the air-pump-based cooling apparatus in a pulsed mode, on-off mode, and/or a varying duty-cycle mode. In an embodiment, the air-pump-based cooling apparatus is a mobile air-pump-based cooling apparatus configured to travel along the transmission line as facilitated by the propulsion system 384. The temperature management device is configured to control a movement of the mobile air-pump-based cooling apparatus from site to site along the line according to local cooling needs as facilitated by the travel control circuit 326. In an embodiment, the air-pump-based cooling apparatus is a mobile air-pump-based cooling apparatus configured to travel along the transmission line as facilitated by the propulsion system. The temperature management device is configured to control a movement of the mobile air-pump-based cooling apparatus continuously through sites along a length of the transmission line as facilitated by the travel control circuit.

In an embodiment, the temperature management device 320 is configured to assess a temperature condition of the transmission line 230.1 based upon a parameter influencing a temperature condition of the transmission line. In an embodiment, the assessment of the temperature condition may be implemented using the temperature condition assessment circuit 328. For example, a parameter influencing a temperature condition of the transmission line may include a factor that affects a temperature of the transmission line. For example, a parameter influencing a temperature condition of the transmission line may include upon a parameter affecting a temperature condition of the transmission line. In an embodiment, the parameter includes an existing parameter influencing the temperature condition of the transmission line. In an embodiment, the parameter includes a predicted parameter influencing the temperature condition of the transmission line. In an embodiment, the parameter includes a power, current, or voltage level of the transmission line. In an embodiment, the parameter includes a wind speed or wind direction affecting the transmission line. In an embodiment, the parameter includes sag of the transmission line. In an embodiment, the parameter includes a temperature at one or more points along the transmission line.

In an embodiment, the temperature management device 320 includes an information-gathering circuit 324 configured to acquire data indicative of a parameter influencing the temperature condition of the transmission line 230.1. For example, the information-gathering circuit may be configured to pull data indicative of a parameter influencing the temperature condition of the transmission line from one or more sources. For example, the information-gathering circuit may be configured to receive data indicative of a parameter influencing the temperature condition of the transmission line from one or more sources. In an embodiment, the data indicative of a parameter includes data generated by a sensor coupled with the transmission line. In an embodiment, the data indicative of a parameter includes weather prediction data. For example, the data may be acquired over the Internet or a private network, illustrated as a wide area network 398, by a receiver circuit 322 or a communications module 332. In an embodiment, the data indicative of a parameter includes data derived from an image of the transmission line. In an embodiment, the air-pump-based cooling apparatus 360 may include an information-gathering circuit 364 configured to acquire data indicative of a parameter influencing the temperature condition of the transmission line.

In an embodiment, the air-pump-based cooling apparatus 360 and the temperature management device 320 are carried by a single chassis. In an embodiment, the air-pump-based cooling apparatus is configured to operate at a location remote from the temperature management device, and the cooling apparatus and to temperature management device configured to communicate via their respective communication device 332 and communication device 368.

Those skilled in the art will recognize that in an embodiment aspects of the temperature management device 320 can be implemented using a hardware, software, and/or firmware implementation. Those skilled in the art will recognize that in an embodiment aspects of the temperature management device can be implemented, individually and/or collectively, by various types of electro-mechanical systems having a wide range of electrical components such as hardware, software, firmware, and/or virtually any combination thereof. Those skilled in the art will recognize that in an embodiment aspects of the temperature management device 320 can be implemented using a general purpose computer programmed to carry out or perform one or more particular functions of the temperature management device. In an embodiment, aspects of the temperature management device may be implemented in part or whole using a computing device 352. In an embodiment, the computing device may be implemented in whole or in part using the general purpose thin computing device 20 described in conjunction with FIG. 1. In an embodiment, the computing device may be implemented in part or whole using the purpose computing device 100 described in conjunction with FIG. 2.

Those skilled in the art will recognize that in an embodiment aspects of the air-pump-based cooling apparatus 360 can be implemented using a hardware, software, and/or firmware implementation. Those skilled in the art will recognize that in an embodiment aspects of the air-pump-based cooling apparatus can be implemented, individually and/or collectively, by various types of electro-mechanical systems having a wide range of electrical components such as hardware, software, firmware, and/or virtually any combination thereof. Those skilled in the art will recognize that in an embodiment aspects of the air-pump-based cooling apparatus can be implemented using a general purpose computer programmed to carry out or perform one or more particular functions of the air-pump-based cooling apparatus. For example, aspects of the air-pump-based cooling apparatus 360 may be implemented in part or whole using a computing device 372. In an embodiment, the computing device may be implemented in whole or in part using the general purpose thin computing device 20 described in conjunction with FIG. 1. In an embodiment, the computing device may be implemented in part or whole using the purpose computing device 100 described in conjunction with FIG. 2.

FIG. 6 illustrates an example operational flow 400 in which embodiments may be implemented. After a start operation, the operational flow includes a receiving operation 410. The receiving operation includes receiving data indicative of a parameter evidencing or influencing a temperature condition of a transmission line of a power transmission system. The power transmission system is in use transport electric power from one place to another. In an embodiment, the receiving operation may be implemented using the receiver circuit 322 or the information gathering circuit 324 described in conjunction with FIG. 4, or the information-gathering circuit 364 described in conjunction with FIG. 5. An evaluation operation 420 includes assessing a temperature condition of the transmission line in response to the data. In an embodiment, the evaluation operation may be implemented via the temperature condition assessment circuit 328 described in conjunction with FIG. 4. A commence 430 operation includes actuating an air-pump-based cooling apparatus in response to the assessment of the temperature condition, the air-pump-based cooling apparatus mounted on the transmission line and configured to cool a portion of the transmission line. In an embodiment, the commence operation may be implemented via the cooling device controller 334 described in conjunction with FIG. 4. The operational flow includes an end operation.

FIG. 7 illustrates an alternative embodiment of the operational flow 400 of FIG. 6. In the alternative embodiment, the operational flow may include at least one additional operation. The at least one additional operation may include an operational flow 440. The operational flow 440 includes an operation 442, an operation 444, and an operation 446. The operation 442 includes receiving subsequent data indicative of a subsequent parameter evidencing or influencing a temperature condition of the transmission line. The operation 444 includes assessing a subsequent temperature condition of the transmission line in response to the subsequent data. The operation 446 includes de-actuating the air-pump-based cooling apparatus in response to the assessment of the subsequent temperature condition.

In an embodiment, the subsequent parameter and the parameter are at least substantially the same parameter. For example, the subsequent parameter and the parameter both may be a temperature of the transmission line 230.1. For example, the parameter may be the temperature of the transmission line at noon, and subsequent parameter may be the temperature of the transmission line at 5 PM the same day. For example, the subsequent parameter and the parameter both may be the ambient air temperature of the transmission line. For example, the subsequent parameter and the parameter may both be the sag of the transmission line 230.1. In an embodiment, the subsequent parameter and the parameter are at least substantially different parameters. For example, the parameter may be the ambient air temperature of the transmission line and the subsequent parameter may be the sag of the transmission line.

FIG. 8 illustrates an example computer program product 500 in which embodiments may be implemented. The computer program product includes computer-readable media 510 bearing program instructions 520. The program instructions which, when executed by a processor of a computing device, cause the computing device to perform a process. The process includes receiving data indicative of a parameter evidencing or influencing a temperature condition of a transmission line of a power transmission system in use to transport electric power from one place to another. The process includes assessing a temperature condition of the transmission line in response to the data. The process also includes actuating an air-pump-based cooling apparatus in response to the assessment of the temperature condition. The air-pump-based cooling apparatus mounted on the transmission line and configured to cool a portion of the transmission line.

In an embodiment, the process of the computer program instructions 520 includes 522 providing a notification of the actuating of the air-pump-based cooling apparatus to at least one of a human, computer, or a system. In embodiment, the process of the computer program instructions includes 524 outputting a signal providing a particular visual depiction indicative of the actuating of the air-pump-based cooling apparatus.

In an embodiment, the computer-readable media 510 includes a tangible computer-readable media 512. In an embodiment, the computer-readable media includes a communication media 514.

FIG. 9 illustrates an alternative embodiment of the process of the computer program instructions 520 of FIG. 8. The alternative embodiment further includes receiving subsequent data indicative of a subsequent parameter evidencing or influencing a temperature condition of the transmission line. The alternative embodiment further includes assessing a subsequent temperature condition of the transmission line in response to the subsequent data. The alternative embodiment further includes de-actuating the air-pump-based cooling apparatus in response to the assessment of the subsequent temperature condition.

Figure 10:
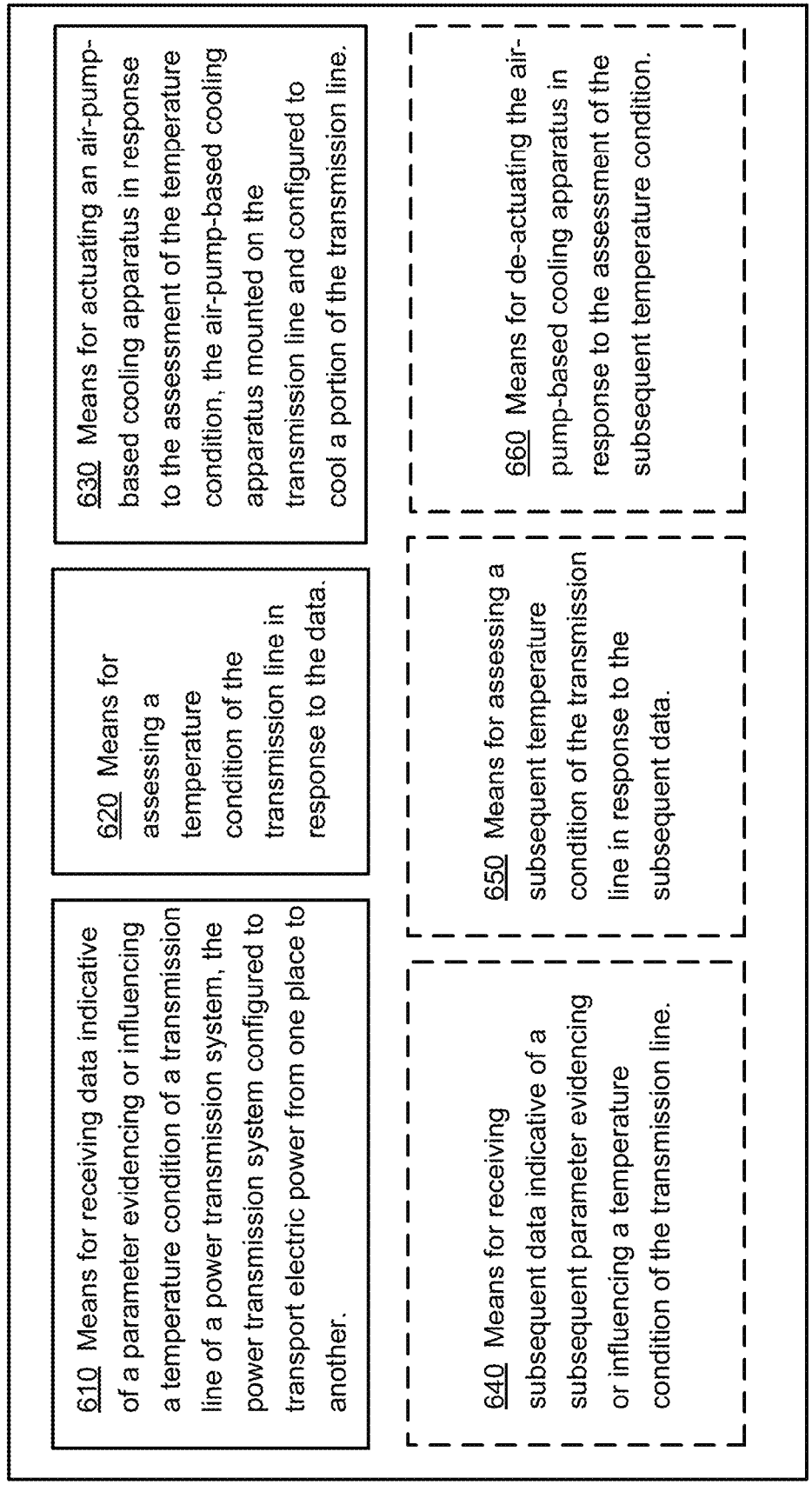
FIG. 10 illustrates an example system 600 in which embodiments may be implemented.

FIG. 10 illustrates an example system 600 in which embodiments may be implemented. The system includes means 610 for receiving data indicative of a parameter evidencing or influencing a temperature condition of a transmission line of a power transmission system. The power transmission system is configured to transport electric power from one place to another. The system includes means 620 for assessing a temperature condition of the transmission line in response to the data. The system includes means 630 for actuating an air-pump-based cooling apparatus in response to the assessment of the temperature condition, the air-pump-based cooling apparatus mounted on the transmission line and configured to cool a portion of the transmission line.

FIG. 10 also illustrates an alternative embodiment of the system 600. The alternative embodiment of the system includes means 640 for receiving subsequent data indicative of a subsequent parameter evidencing or influencing a temperature condition of the transmission line. The alternative embodiment of the system includes means 650 for assessing a subsequent temperature condition of the transmission line in response to the subsequent data. The alternative embodiment of the system includes means 660 for de-actuating the air-pump-based cooling apparatus in response to the assessment of the subsequent temperature condition.

FIG. 11 illustrates an example environment 700. The example environment includes the high-voltage power transmission system 205 described in conjunction with FIG. 3, which is illustrated by a portion of the tower 210A, the insulator 220A.1, and the transmission line 230.1. The power transmission system is configured to transport electric power from one place to another. The environment includes a closed-cycle heat transfer device 740. The closed-cycle heat transfer device includes a hollow member 742, a working fluid 744, and a heat removal structure 762. FIGS. 11A-11D illustrate several alternative orientations of the hollow member and the working fluid with respect to the transmission line. In addition, FIG. 11D illustrates the transmission line as transmission line 730D having multiple conductors, which are illustrated by a conductor 746D.

The hollow member 742 is configured to be thermally coupled with and to be disposed substantially parallel to a length of a live transmission line 230.1 of the overhead power transmission system 205. The working fluid is contained within the hollow member and tuned to transport heat received from the live transmission line to the heat removal structure 742 utilizing a phase change. The heat removal structure 762 is configured to dissipate the transported heat. In an embodiment, the heat removal structure includes a condenser region of a heat pipe.

In an embodiment, the hollow member 742 and the working fluid 744 are included in a tubular heat pipe. For example, FIG. 11A illustrates a cross-section of an embodiment where an evaporator region 744A and a hollow member 742A of a tubular heat pipe 740A run parallel to a portion of a transmission line 730A. In an alternative embodiment, an evaporator region of the tubular heat pipe region may be wound around the transmission line in a helix pattern. For example, FIG. 11B illustrates a cross-section of an embodiment where an evaporator region 744B and a hollow member 742B of a tubular heat pipe 740B run parallel to and surround a portion of a transmission line 730B. For example, FIG. 11C illustrates a cross-section of an embodiment where an evaporator region 744C and a hollow member 742C of a tubular heat pipe 740C runs parallel to and are surrounded by a portion of a transmission line 730C. For example, FIG. 11D illustrates a cross-section of an embodiment where an evaporator region 744D and a hollow member 742D of a tubular heat pipe 740D are surrounded by multiple conductors, illustrated by the conductor 746D, of a portion of a transmission line 730D. In an embodiment, the heat pipe includes a flat heat pipe, for example, such as a flat plate. In an embodiment, the heat pipe includes a loop heat pipe. In an embodiment, the closed-cycle heat transfer device 740 includes a closed-cycle heat transfer device configured to use gravity for liquid return.

In an embodiment, the hollow member 742 includes a hollow thermally conductive member. In an embodiment, the hollow member includes a tubular member. In an embodiment, the hollow member includes a planar member. For example, the planar member may include a flat plate. In an embodiment, the hollow member is formed in a hollow portion of a conductor of the live transmission line 230.1. For example, see FIG. 11C. In an embodiment, the hollow member is described by a plurality of conductors of the live transmission line. For example, see FIG. 11D. In an embodiment, the hollow member is formed in a core region of an annular conductor or a multi-strand conductor of the live transmission line. For example, see FIG. 11C or FIG. 11D.

In an embodiment, the hollow member 742 is in thermal contact with the live transmission line 230.1 at one or more heat extraction locations, illustrated by a heat extraction location 752. In an embodiment, the hollow member is disposed in a region outside a conductor of the live transmission line. For example, see FIG. 11A and FIG. 11B. In an embodiment, the hollow member is disposed in a helix pattern around a conductor of the live transmission line.

In an embodiment, the overhead power transmission system 205 includes a high-voltage overhead power transmission system. In an embodiment, the overhead power transmission system includes a power distribution system.

In an embodiment, the working fluid 744 is contained within the hollow member 742 and tuned to transport heat received from the live transmission line 230.1 and absorbed from the hollow member 742 to the heat removal structure 762. In an embodiment, the working fluid is tuned to transport heat received from the live transmission line to a heat removal structure using an evaporation and condensation cycle. In an embodiment, the working fluid is tuned to transport heat received from the live transmission line to a heat removal structure using a phase change. In an embodiment, the working fluid is tuned to transport heat received from the live transmission line to a heat removal structure using two phases. In an embodiment, the working fluid is tuned to transport heat received from the live transmission line to a heat removal structure using convection. In an embodiment, the working fluid is a non-electrically conductive working fluid.

In an embodiment, the heat transfer device 740 is further configured to equilibrate temperatures and inhibit formation of relatively hot spots along the live transmission line 230.1. In an embodiment, the heat removal structure includes a passive heat removal structure. In an embodiment, the heat removal structure includes an active heat removal structure. In an embodiment, the heat removal structure 762 includes a cooling site configured to dissipate the transported heat. In an embodiment, the heat removal structure includes an evaporator portion of another closed-cycle heat transfer device. For example, the heat removal structure 762 may be coupled with an evaporator region of another heat removal structure (not illustrated). In an embodiment, the heat removal structure is configured to be mounted on the live transmission line, for example, as illustrated by FIG. 11. In an embodiment, the heat removal structure is configured to be maintained at a location physically off of or away from the live transmission line (not illustrated). In an embodiment, the heat removal structure is configured to be mounted on a transmission line support tower or other structure (not illustrated). For example, the heat removal structure may be configured to be mounted or carried by a portion of the tower 210A.

In an embodiment, the heat removal structure 762 includes fins configured to facilitate convective cooling by ambient air. For example, see fins 1020 described in conjunction with FIG. 14 infra. In an embodiment, the heat removal structure includes a fan configured to facilitate convective cooling by ambient air. In an embodiment, the heat removal structure further includes a fan configured to actively facilitate convective cooling by ambient air. In an embodiment, the heat removal structure includes a heat-exchanger configured to transfer the transported heat into another fluid. For example, several heat tubes may be linked in series. In an embodiment, the heat removal structure is configured to dissipate the transported heat to another heat removal structure.

FIG. 12 illustrates an example operational flow 800 reducing a temperature of a transmission line of a power transmission system. The power transmission system is configured to transmit electrical power from one place to another. After a start operation, the operational flow includes a power-up operation 810. The power-up operation includes transmitting electric power over the transmission line. For example, the power-up operation may be implemented by applying electrical power to the transmission line 230.1 of the power transmission system 205 described in conjunction with FIG. 3. A deployment operation 820 includes maintaining a closed-cycle heat transfer device in a thermal coupling with and disposed substantially along a portion of the transmission line. The closed-cycle heat transfer device having a hollow member containing a working fluid tuned to transport heat received from the transmission line to a heat removal structure. For example, the deployment operation may be implemented by maintaining the closed-cycle heat transfer device 740 in thermal contact with the transmission line 230.1 as described in conjunction with FIG. 11. A temperature management operation 830 includes removing heat from the portion of the transmission line using the closed-cycle heat transfer device. For example, the temperature management operation may be implemented using the heat removal structure 762 described in conjunction with FIG. 11. The operational flow includes an end operation.

FIG. 13 illustrates an example system 900 in which embodiments may be implemented. The system includes means 910 for applying electrical power to a transmission line of a power transmission system configured to transport electric power from one place to another. The system includes means 920 for maintaining a closed-cycle heat transfer device in a thermal coupling with and disposed substantially along a portion of the transmission line. The closed-cycle heat transfer device having a hollow member containing a working fluid tuned to transport heat received from the transmission line to a means for dissipating heat. The system includes means 930 for dissipating heat configured to be mounted on the transmission line or on a structure associated with the power transmission system.

Figure 14:
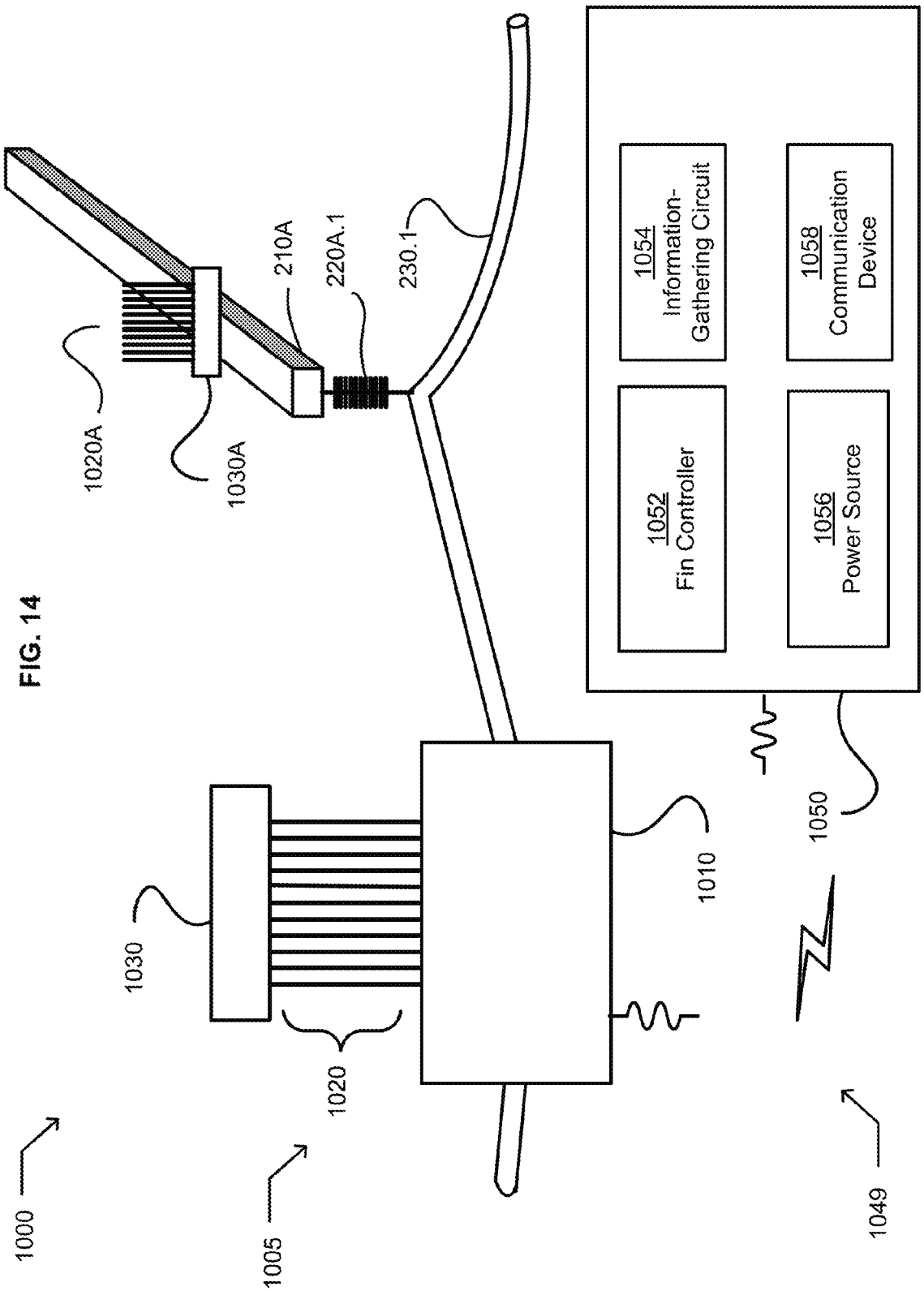
FIG. 14 illustrates an example environment 1000 in which embodiments may be implemented.

FIG. 14 illustrates an example environment 1000. The example environment includes the high-voltage power transmission system 205 described in conjunction with FIG. 3, and is illustrated by a portion of the tower 210A, the insulator 220A.1, and the transmission line 230.1. The power transmission system is configured to transport electric power from one place to another. The environment includes a heat-dissipation device 1005 adapted for dissipating heat generated by live transmission lines of the power transmission system. The heat dissipation device includes a heat-acquisition element 1010 configured to absorb heat from a portion of a live transmission line of the power transmission system, illustrated as the live transmission line 230.1. The heat dissipation device includes an assembly of one or more controllable fins 1020 thermally coupled to the heat-acquisition element, and configured to dissipate at least a portion of the heat absorbed by the heat-acquisition element.

In an embodiment, the power transmission system 205 includes a high-voltage power transmission system. In an embodiment, the power transmission system includes a power distribution system. In an embodiment, the transmission line 230.1 includes an overhead transmission line.

In an embodiment, the heat-acquisition element 1010 is configured to be thermally coupled with a portion of a live transmission line 230.1 and to absorb heat from the portion of the live transmission line. In an embodiment, the heat-acquisition element is configured to be disposed substantially parallel to a portion of a live transmission line and to absorb heat from the portion of the live transmission line. In an embodiment, the heat-acquisition element is integral to a structure of a conductor of the live transmission line. See FIGS. 11B-11D for examples of a heat acquisition element integral to a structure of a conductor. In an embodiment, the heat-acquisition element is configured as a discrete unit attachable to the live transmission line. See FIG. 11A for an example. In an embodiment, the heat-acquisition element includes a continuous supporting tape or cord that can be wrapped around, tied to, or otherwise attached to a conductor of the live transmission line.

In an embodiment, the one or more controllable fins 1020 include one or more controllable fins attached to or extending from the heat-acquisition unit 1010. In an embodiment, the one or more controllable fins include a fin having a controllable orientation or controllable extent relative to the heat-acquisition element. In an embodiment, the one or more controllable fins include a fin having a rotatable orientation relative to the heat-acquisition element or a reversible extension from the heat-acquisition element. In an embodiment, the one or more controllable fins are shaped to minimize electric field enhancement or corona discharge. In an embodiment, the one or more controllable fins are made of a metallic or a thermally-conductive material. In an embodiment, the one or more controllable fins are made of high conductivity diamond-like materials. In an embodiment, the one or more controllable fins include a plurality of controllable fins extending in substantially different directions. In an embodiment, the assembly of one or more controllable fins is translationally movable along the power line. In an embodiment, the one or more controllable fins include a controllable fin that with respect to wind flow preferentially extends in an orientation that reduces wind drag. In an embodiment, the one or more controllable fins include a controllable fin that with respect to wind flow preferentially extends in an orientation that enhances convective cooling. In an embodiment, the one or more fins are arranged so that in a retracted position they are faired into the transmission line 230.1 or a supporting tape to minimize wind drag. In an embodiment, the one or more fins include an electrically insulative material with a high thermal conductivity. In an embodiment, the one or more fins include a metallic material with an electrically insulative exterior coating.

In an embodiment, the heat-dissipation 1005 device includes an actuator 1030 configured to change an orientation or extent of a fin of the one or more controllable fins relative to the heat-acquisition element 1010. In an embodiment, the heat-dissipation device includes an actuator configured to change an orientation or extent of a fin of the one or more controllable fins relative to the live power transmission line. In an embodiment, the actuator is configured to automatically change an orientation or extent of a fin of the one or more controllable fins relative to the heat-acquisition element. For example, automatically may include self-acting or operating by its own mechanism. In an embodiment, the actuator is configured to change an orientation or extent of a fin of the one or more controllable fins relative to the heat-acquisition element in response to a controller. In an embodiment, the actuator includes an electrical, mechanical, or electro-mechanical actuator. In an embodiment, the actuator is configured to rotate a fin of the one or more controllable fins into a selected wind orientation or withdraw an extended fin toward the heat-acquisition element in response to a wind load on the live transmission line. For example, the actuator may rotate a fin of the one or more controllable fins to an exposure angle providing maximum cooling by a particular wind load. For example, the actuator may extend a fin of the one or more controllable fins from the heat-acquisition element if the wind load is relatively low to provide maximum cooling, or withdraw an extended fin if the wind is relatively high to minimize wind load on the transmission line. In an embodiment, the actuator is configured to rotate a fin of the one or more controllable fins into a selected wind orientation or extend a fin in response to an absence of a wind load on the live transmission line. In an embodiment, the actuator is configured to rotate a fin of the one or more controllable fins into a selected wind orientation or extend a fin in response to a need for heat dissipation by the live transmission line. In an embodiment, the actuator is configured to rotate a fin of the one or more controllable fins into a selected wind orientation, or withdraw an extended fin toward the heat-acquisition element in response to an absence of a need for heat dissipation by the live transmission line. For example, the actuator may rotate a fin to an orientation generating a minimum wind resistance to an existing wind. For example, the actuator may retract the fin toward the heat-acquisition element if a need for heat dissipation by the live transmission line is low. In an embodiment, the actuator is configured to extend a retractable fin of the one or more controllable fins out of the heat-acquisition element if the need for heat dissipation by the live transmission line is high or if the wind load is low. In an embodiment, the actuator is configured to withdraw a retractable fin of the one or more controllable fins into the heat-acquisition element if the need for heat dissipation by the live transmission line is low or if the wind load is high. In an embodiment, the actuator is temperature driven. In an embodiment, the temperature-driven actuator may include any one of a shape-memory alloy, a Nitinol, a bimetallic, a thermal expansion, a thermal-wax, and/or a phase change type actuator. In an embodiment, the actuator is inductively powered by line current. In an embodiment, the actuator is powered by one or more of solar, wind, and primary battery power sources. In an embodiment, the actuator is activated by meteorological sensors including one or more of temperature and/or wind velocity sensors. For example, in an embodiment, the heat-dissipation device may include the meteorological sensors and associated circuitry configured to communicate with the actuator (not illustrated), or may receive a control signal from a controller, such as a transmission-line temperature manager 1050 described in more detail below, and based upon sensor data acquired by information-gathering circuit 1054. In an embodiment, the actuator is controlled remotely via wireless or transmission line-conducted signals. For example, in an embodiment, the heat-dissipation device 1005 may include a communication device (not illustrated) configured to wirelessly communicate with a controller, such as a fin controller 1052 of a transmission-line temperature manager 1050 described below in more detail. In an embodiment, the actuator is communicatively coupled via wireless and/or wired links to the heat-dissipating structure, temperature sensors, anemometers, remote controllers, processors, or users. For example, the actuator may be implemented using the transmission-line temperature manager, or may be implemented by a remote device mounted on a transmission tower, such as the transmission tower 210A, or elsewhere. In an embodiment, the actuator is coupled to a back-up power unit that provides power for fail-safe retraction of fins.

In an embodiment, an alternative embodiment of the one or more controllable fins is illustrated as one or more controllable fins 1020A carried by an arm of the transmission tower 210A. In this alternative embodiment, the heat dissipation device 1005 may include a heat-conduit (not illustrated) configured to transport heat from the heat acquisition element 1010 to the one or more controllable fins 1020A. In an embodiment, an alternative embodiment of the actuator is illustrated as the actuator 1030A configured to change an orientation or extent of a fin of the one or more controllable fins 1022 relative to the arm of the transmission tower 210A.

FIG. 14 also illustrates an alternative embodiment of the example environment 1000. This alternative embodiment includes a thermal management system 1049 adapted for dissipating heat generated by transmission lines of a power transmission system, such as by the power transmission system 205 described in conjunction with FIG. 3, and which is illustrated in FIG. 14 by a portion of the tower 210A, the insulator 220A.1, and the transmission line 230.1. The thermal management system includes the heat-dissipation device 1005 and the transmission-line temperature manager 1050. The heat-dissipation device includes the heat-acquisition element 1010 configured to absorb heat from a portion of a live transmission line of the power transmission system. The heat-dissipation device includes the assembly of one or more controllable fins 1020 thermally coupled to the heat-acquisition element and configured to dissipate at least a portion of the absorbed heat. The thermal management system includes the transmission-line temperature manager 1050 configured to control an aspect of the assembly of one or more controllable fins. For example, the temperature manager may be configured to control an orientation or extent of an extension of a fin of the one or more controllable fins. In an embodiment, the temperature manager may include the fin controller 1052, the information gathering circuit 1054, a power source 1056, and a communication device 1058. For example, the power source 1056 may be at least substantially similar to the power source 366 of FIG. 5. For example, the communication device 1058 may be substantially similar to the communication device 332 described in FIG. 4 or the communication device 368 described in FIG. 5.

In an embodiment, the transmission-line temperature manager 1050 is configured to control an aspect of the assembly of one or more controllable fins 1020 in response to an existing or predicted wind load on the transmission line 230.1. For example, data indicative of an existing or predicted wind load may be acquired by the information gathering circuit 1054 from a network, such as the network 398 of FIG. 4, or from sensors positioned proximate to the transmission line. For example, the control of an aspect may be implemented using the fin controller 1052, and control instructions communicated to the heat-dissipation device using the communication device 1058. In an embodiment, the transmission-line temperature manager is configured to control an aspect of the assembly of one or more controllable fins in response to an existing or predicted ambient air temperature proximate to the transmission line. In an embodiment, the transmission-line temperature manager is configured to control an aspect of the assembly of one or more controllable fins in response to an existing or predicted temperature of the transmission line.

FIG. 15 illustrates an example operational flow 1100 dissipating heat generated by transmission lines of a power transmission system configured to transmit electrical power from one place to another. After a start operation, the operational flow includes a power-up operation 1110. The power-up operation includes transmitting electric power over a transmission line of the power transmission system from one place to another. For example, the power-up operation may be implemented by applying electrical power to the transmission line 230.1 of the power transmission system 205 described in conjunction with FIG. 3. A deployment operation 1120 includes maintaining a heat-acquisition element of a heat-dissipating structure in thermal contact with the transmission line. The heat-dissipating structure including an assembly of one or more controllable fins attached to or extending from the base. For example, the deployment operation may be implemented by maintaining the heat-dissipation device 1005 in thermal contact with the transmission line 230.1 as described in conjunction with FIG. 14. A positioning operation 1130 includes changing an orientation or an extent of a fin of the one or more controllable fins relative to the heat-acquisition element in response to a heat dissipation requirement by the live transmission line. For example, the positioning operation may be implemented by the actuator 1030 described in conjunction with FIG. 14. The operational flow includes an end operation.

In an embodiment, the operational flow 1100 may include at least one additional operation, illustrated as the operation 1140. The at least one additional operation may include an operation 1142 or an operation 1144. The operation 1142 includes initiating the change in an orientation or extent of a fin of the one or more controllable fins in response to a temperature condition of the transmission line. The operation 1144 includes initiating the change in orientation or extent of a fin of the one or more controllable fins in response to an environmental parameter influencing a temperature condition of the transmission line.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims, the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
an air-pump-based cooling apparatus configured to mount on and cool a portion of a live transmission line of a power transmission system, the power transmission system configured to transport electric power from one place to another; and
a temperature management device configured to assess a temperature condition of the transmission line and actuate the air-pump-based cooling apparatus in response to the assessment.

2. The system of claim 1, wherein the power transmission system includes a high-voltage power transmission system.

3. The system of claim 1, wherein the power transmission system includes a power distribution system.

4. The system of claim 1, wherein the transmission line includes a live overhead transmission line.

5. The system of claim 1, wherein the air-pump-based cooling apparatus is configured to actively cool a portion of the transmission line.

6. The system of claim 1, wherein the air-pump-based cooling apparatus is configured to statically mount on a transmission line.

7. The system of claim 1, wherein the air-pump-based cooling apparatus is configured to mount on and travel over a transmission line.

8. The system of claim 1, wherein the air-pump-based cooling apparatus is configured to operate on power drawn from the power transmission system.

9. The system of claim 1, wherein the air-pump-based cooling apparatus is inductively or quasi-DC power coupled to one or more power transmission lines of the power transmission system.

10. The system of claim 1, wherein the air-pump-based cooling apparatus includes one or more line-mounted fans.

11. The system of claim 10, wherein the one or more line-mounted fans are configured to force airflow along the transmission line.

12. The system of claim 10, wherein the one or more line-mounted fans include independently movable sets of blades with different sets having different blade radii and/or blade pitch.

13. The system of claim 10, wherein the one or more line-mounted fans include one or more fan blades that can be recessed or retracted when not in use.

14. The system of claim 10, wherein the one or more line-mounted fans are configured to operate at fixed sites along the transmission line.

15. The system of claim 10, wherein the one or more line-mounted fans are configured to be longitudinally propelled along the transmission line.

16. The system of claim 1, wherein the air-pump-based cooling apparatus is further configured to force airflow through a heat exchanger device of the cooling apparatus.

17. The system of claim 16, wherein the air-pump-based cooling apparatus includes one or more line-mounted fans configured to force airflow through a heat exchanger device of the cooling apparatus.

18. The system of claim 1, wherein the air-pump-based cooling apparatus includes an electrostatic air pump.

19. The system of claim 1, wherein the temperature management device is configured to assess a temperature of the transmission line and actuate the air-pump-based cooling apparatus in response to the assessment.

20. The system of claim 1, wherein the temperature management device is configured to assess an ambient wind velocity proximate to the transmission line and actuate the air-pump-based cooling apparatus in response to the assessment.

21. The system of claim 1, wherein the temperature management device is configured to assess a line sag of the transmission line and actuate the air-pump-based cooling apparatus in response to the assessment.

22. The system of claim 1, wherein the temperature management device is configured to assess a power, current, or voltage level of the transmission line and actuate the air-pump-based cooling apparatus in response to the assessment.

23. The system of claim 1, wherein the air-pump-based cooling apparatus is a mobile air-pump-based cooling apparatus configured to travel along the transmission line, and the temperature management device is configured to control a movement of the mobile air-pump-based cooling apparatus from site to site along the line according to local cooling needs.

24. The system of claim 1, wherein the temperature management device is configured to assess a temperature condition of the transmission line based upon a parameter influencing a temperature condition of the transmission line.

25. The system of claim 24, wherein the parameter includes an existing parameter influencing the temperature condition of the transmission line.

26. The system of claim 24, wherein the parameter includes a predicted parameter influencing the temperature condition of the transmission line.

27. The system of claim 24, wherein the parameter includes a power, current, or voltage level of the transmission line.

28. The system of claim 24, wherein the parameter includes a wind speed or wind direction effecting the transmission line.

29. The system of claim 24, wherein the parameter includes sag of the transmission line.

30. The system of claim 24, wherein the parameter includes a temperature at one or more points along the transmission line.

31. The system of claim 1, wherein the temperature management device further includes an information-gathering circuit configured to acquire data indicative of a parameter influencing the temperature condition of the transmission line.

32. The system of claim 31, wherein the data indicative of a parameter includes data generated by a sensor coupled with the transmission line.

33. The system of claim 31, wherein the data indicative of a parameter includes weather prediction data.

34. The system of claim 31, wherein the data indicative of a parameter includes data derived from an image of the transmission line.

35. The system of claim 1, wherein the air-pump-based cooling apparatus and the temperature management device are carried by a single chassis.

36. The system of claim 1, wherein the air-pump-based cooling apparatus is configured to operate at a location remote from the temperature management device.

37. A method comprising:
receiving data indicative of a parameter evidencing or influencing a temperature condition of a transmission line of a power transmission system, the power transmission system in use transport electric power from one place to another;

assessing a temperature condition of the transmission line in response to the data; and actuating an air-pump-based cooling apparatus in response to the assessment of the temperature condition, the air-pump-based cooling apparatus mounted on the transmission line and configured to cool a portion of the transmission line.

38. The method of claim 37, further comprising:

receiving subsequent data indicative of a subsequent parameter evidencing or influencing a temperature condition of the transmission line;

assessing a subsequent temperature condition of the transmission line in response to the subsequent data; and de-actuating the air-pump-based cooling apparatus in response to the assessment of the subsequent temperature condition.

39. The method of claim 38, wherein the subsequent parameter and the parameter are at least substantially the same parameter.

40. The method of claim 38, wherein the subsequent parameter and the parameter are at least substantially different parameters.

41. A computer program product comprising:

(a) program instructions which, when executed by a processor of a computing device, cause the computing device to perform a process including:

(i) receiving data indicative of a parameter evidencing or influencing a temperature condition of a transmission line of a power transmission system in use to transport electric power from one place to another;

(ii) assessing a temperature condition of the transmission line in response to the data; and (iii) actuating an air-pump-based cooling apparatus in response to the assessment of the temperature condition, the air-pump-based cooling apparatus mounted on the transmission line and configured to cool a portion of the transmission line; and (b) computer-readable media bearing the program instructions.

42. The computer program product of claim 41, the process further comprising:

(iv) receiving subsequent data indicative of a subsequent parameter evidencing or influencing a temperature condition of the transmission line;

(v) assessing a subsequent temperature condition of the transmission line in response to the subsequent data; and (vi) de-actuating the air-pump-based cooling apparatus in response to the assessment of the subsequent temperature condition.

43. The computer program product of claim 41, the process further comprising:

providing a notification of the actuating of the air-pump-based cooling apparatus to at least one of a human, computer, or a system.

44. The computer program product of claim 41, the process further comprising:

outputting a signal providing a particular visual depiction indicative of the actuating of the air-pump-based cooling apparatus.

45. The computer program product of claim 41, wherein the computer-readable media includes a tangible computer-readable media.

* * * * *

UNITED STATES PATENT AND TRADEMARK OFFICE
CERTIFICATE OF CORRECTION

| | | |
|---|---|---|
| PATENT NO. | : 9,188,995 B2 | Page 1 of 1 |
| APPLICATION NO. | : 13/454409 | |
| DATED | : November 17, 2015 | |
| INVENTOR(S) | : Roderick A. Hyde et al. | |

It is certified that error appears in the above-identified patent and that said Letters Patent is hereby corrected as shown below:

IN THE CLAIMS

Column 26, line 36, claim 28: "a wind speed or wind direction effecting the transmission line." should read --a wind speed or wind direction affecting the transmission line.--

Signed and Sealed this
Twenty-ninth Day of March, 2016

Michelle K. Lee
*Director of the United States Patent and Trademark Office*